April 13, 1926.
S. BERGER
ARTIFICIAL FLOWER
Filed Dec. 8, 1925
1,580,399
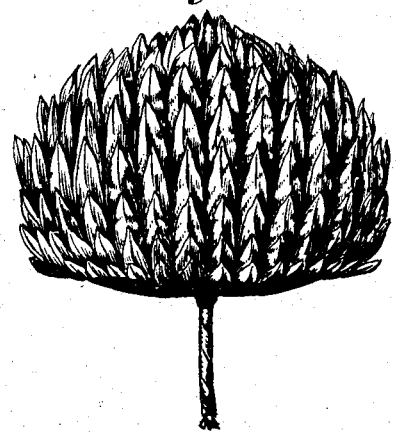
Fig:1.
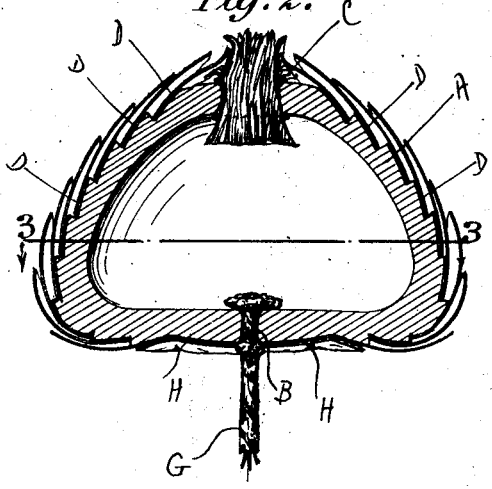
Fig:2.
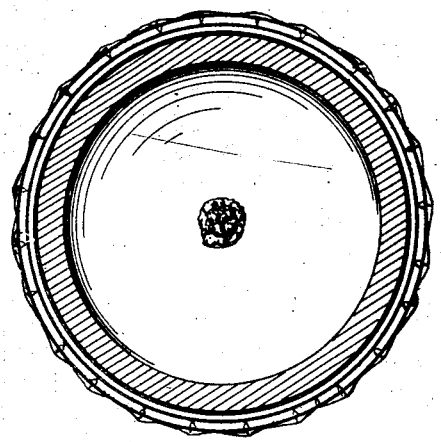
Fig:3.
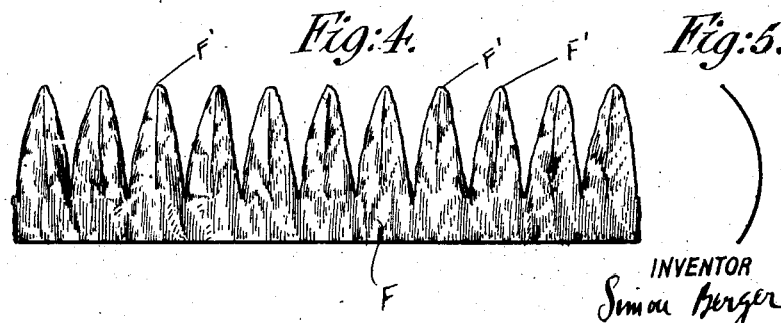
Fig:4.   Fig:5.
INVENTOR
Simon Berger
BY Mock & Blum
ATTORNEYS.

Patented Apr. 13, 1926.

1,580,399

UNITED STATES PATENT OFFICE.

SIMON BERGER, OF NEW YORK, N. Y.

ARTIFICIAL FLOWER.

Application filed December 8, 1925. Serial No. 73,963.

*To all whom it may concern:*

Be it known that I, SIMON BERGER, a citizen of the United States, residing at New York city, in the county of New York and State of New York, have invented certain new and useful Improvements in Artificial Flowers, of which the following is a specification.

This invention relates to improvements in artificial flowers and more particularly has for its object the provision of a many-petalled flower which will keep its shape permanently.

Another object of the invention is the provision of an artificial flower having many leaves or petals which can be economically manufactured.

A further particular object of this invention is the provision of an artificial chrysanthemum which will be superior to the artificial chrysanthemum now made and which will permanently retain its shape.

Further objects of the invention will be apparent from the specification and drawings in which—

Fig. 1 is a perspective view of an artificial chrysanthemum flower made according to this invention.

Fig. 2 is a vertical section and

Fig. 3 a horizontal section thereof, along the line 3—3 of Fig. 2.

Fig. 4 is a plan view of one of the elements used to constitute a series of petals in my improved artificial flower.

Fig. 5 is a sectional view of one of said petals.

My improved flower is constructed as follows:—

I use as the foundation or base of my artificial flower, a conical member A which is preferably made of papier mâché or similar materials and is of moderate thickness. The frame A has a perforation B in the bottom for the stem of the flower and a larger perforation at the top C for the topmost series of petals or leaves. The sides of the frame A have a series of gradations or steps D formed in the body of the frame, which steps serve as guides for the insertion of the series of petals which are grouped around the frame A. These petals are not inserted singly, but are cut by a die from muslin or similar fabric in series as shown in Fig. 4 of the drawing. A series of these petals designated as F in the drawing, may be of sufficient length to completely encircle a portion of the frame A, or may be made in units of approximately ten petals each, and these units are firmly pasted with glue on the sides of the steps D as is clearly shown in Fig. 2 of the drawing.

To finish the flower, a stem G is inserted through the orifice B, the stem G having the protective foliage H attached to same which covers the underside of the frame A. The flower is finished by inserting through the orific C a series of compact petals which are pasted to the sides of the orifice C. The individual petals F' are crinkled or otherwise formed into the shape in which they should appear in the finished flower, and having a short base as clearly shown in Fig. 4, there is little tendency in the petals to flatten or lose their shape.

An artificial flower constructed according to the plan here shown, has a firm and hard center to which the petals are attached near their ends and provides a more durable artificial flower not hitherto known in the art.

Having fully described my invention, what I claim is:

1. An artificial flower comprising a cone-shaped inner frame having an orifice at the top and bottom, a stem attached to the bottom of said frame through the bottom orifice, and a series of petals grouped concentrically around said frame and parallel with the sides thereof.

2. An artificial flower comprising a durable cone-shaped inner frame, a series of petals attached step-wise perpendicularly to the sides of said frame and indentations in the sides of said frame in which said petals rest.

3. An artificial flower comprising a durable cone-shaped inner frame, a series of petals attached step-wise perpendicularly to the sides of said frame and a series of circular supports in said frame for said petals.

4. An artificial flower comprising a conical papier mâché frame, a series of petals grouped concentrically around said frame, said petals being arranged parallel with the sides thereof, an opening in the top of said frame to receive a compact mass of petals and an opening in the bottom of said frame in which the stem of the flower is positioned.

5. An artificial flower comprising a conical papier mâché frame, a series of indentations in the sides of said frame and a series of petals attached to said frame in said indentations, said petals having their surfaces parallel to the sides of the frame.

In testimony whereof I affix my signature.

SIMON BERGER.